United States Patent [19]

Tomantschger et al.

[11] Patent Number: 5,340,666
[45] Date of Patent: Aug. 23, 1994

[54] RECHARGEABLE ALKALINE MANGANESE CELL HAVING IMPROVED CAPACITY AND IMPROVED ENERGY DENSITY

[75] Inventors: Klaus Tomantschger; Ronald J. Book; Robert D. Findlay, al of Mississauga, Canada

[73] Assignee: Battery Technologies Inc., Richmond Hill, Canada

[21] Appl. No.: 110,203

[22] Filed: Aug. 23, 1993

Related U.S. Application Data

[63] Continuation of Ser. No. 893,793, Jun. 4, 1992, abandoned, which is a continuation-in-part of Ser. No. 667,476, Mar. 11, 1991, abandoned.

[51] Int. Cl.$^5$ .............................................. H01M 10/24
[52] U.S. Cl. ................................... 429/59; 429/165; 429/224; 429/229
[58] Field of Search ............... 429/206, 224, 229, 231, 429/57, 59, 212, 217, 165

[56] References Cited

U.S. PATENT DOCUMENTS

| | | | |
|---|---|---|---|
| 2,935,547 | 5/1960 | Kordesch | 429/230 X |
| 2,993,947 | 7/1961 | Leger | 429/165 X |
| 3,530,496 | 9/1970 | Amano et al. | 429/224 X |
| 3,716,411 | 2/1973 | Ogawa et al. | 429/224 X |
| 4,091,178 | 5/1978 | Kordesch | 429/60 |
| 4,209,577 | 6/1980 | Clash | 429/206 |
| 4,451,543 | 5/1984 | Dzieciuch et al. | 429/206 |
| 4,857,424 | 8/1989 | Larsen et al. | 429/206 |
| 4,863,817 | 9/1989 | Ogino et al. | 429/224 X |
| 4,865,927 | 9/1989 | Laig-Horstebrock et al. | 429/50 |
| 4,957,827 | 9/1990 | Kordesch et al. | 429/60 |
| 5,043,234 | 8/1991 | Tomantschger et al. | 429/59 |
| 5,162,169 | 11/1992 | Tomantschger et al. | 429/59 |

FOREIGN PATENT DOCUMENTS 9117581 11/1991 World Int. Prop. O.

OTHER PUBLICATIONS

Batteries, vol. 1, published 1974 by Marcel Dekker Inc., New York-pp. 281 to 291-edited by Karl Kordesch (month unknown).

*Primary Examiner*—Anthony Skapars
*Attorney, Agent, or Firm*—Donald E. Hewson

[57] ABSTRACT

A rechargeable alkaline manganese cell provided, having improved capacity and improved energy density. The cell is anode limited, and each of the anode and cathode is physically dimensioned so that the anode has a capacity in the range of from about 55% to 100% of the theoretical one electron capacity of the cathode. The gravimetric energy density of the cell exceeds 70 Wh/kg, and the volumetric energy density of the cell exceeds 200 Wh/liter. Each of the anode and cathode may comprise additional additives. For example, the cathode may include additional hydrophobic materials and a porous additive such as carbon black so as to improve gas transport of hydrogen gas into the cathode where it is oxidized; and the anode may comprise hydrogen gassing inhibitors as well as hydrogen gas recombing agents.

14 Claims, 3 Drawing Sheets

RECHARGEABLE ALKALINE MANGANESE CELL HAVING IMPROVED CAPACITY AND IMPROVED ENERGY DENSITY

This application is a continuation application of U.S. continuation-in-part application of Ser. No. 07/893,793 filed Jun. 4, 1992, now abandoned, which was a continuation-in-part of application Ser. No. 07/667,476 filed Mar. 11, 1991, now abandoned.

FIELD OF THE INVENTION

This invention relates to rechargeable alkaline manganese dioxide cells, and especially provides such cells having improved capacity and improved energy densities. The usual embodiment of such cells is contemplated as a "bobbin" type cylindrical cell, but spirally wound cells and flat plate cells may also be provided in keeping with the present invention. A typical cell, in any event, comprises a manganese dioxide cathode, a zinc anode, a separator between them, a container for the cell, a closure member to seal the cell, and an alkaline electrolyte—usually potassium hydroxide.

BACKGROUND OF THE INVENTION

Manganese dioxide electrodes as used in rechargeable alkaline manganese dioxide cells are reversible only if the manganese dioxide cathodes are discharged to the point where the $MnO_2$ is converted to $Mn_2O_3$ (i.e., the one electron discharge level). It has been well established that if the discharge continues beyond that level, an irreversible phase change occurs so that the manganese dioxide cathode is no longer rechargeable. Under certain conditions, it is now possible that $MnO_2$ electrodes for rechargeable alkaline cells can be rendered reversible within the two electron range.

It has always been desirable to produce rechargeable manganese dioxide cells with zinc anodes—especially cylindrical cells having conventional cylindrical configurations—to have high energy density. This has not been particularly successful, and numerous difficulties have been encountered. Several approaches have been provided to ensure reversibility and rechargeability of $MnO_2$ cells, including the provision of electronic means so as to prevent overdischarge of the $MnO_2$; designing the cell so as to be anode limited; and modifying the $MnO_2$ particularly by the addition of heavy metals thereto.

Indeed, rechargeable alkaline $MnO_2/Zn$ cells have been available, at least in the North American market, since the late 1960's. However, those cells were not generally successful, and by the mid 1970's they were removed from the market. At least in part, the lack of success of those cells was due to the fact that they were generally assembled in batteries and not available in single cell configurations, and that they were required to be monitored very carefully to determine the end of the useful discharge capacity. Such monitoring was by timing the operation of the cells, or by the expensive incorporation of electronic control means to determine the point of discharge beyond which further discharge could not be tolerated. Moreover, the cells were quite modest in terms of their density capabilities, and "D" cells having nominal 2 Ah capacities had energy densities of, at best, about 52 Wh/liter or 18 Wh/Kg.

To overcome those difficulties, cells were then developed by which anode limitation of the cells was imposed; meaning that the capacity of the anode was severely limited so that it became impossible to discharge the manganese dioxide cathodes to more than about 40% of their theoretical capacity. By these means, the rechargeability of the $MnO_2$ was assured. By providing cells having severe anode limitation characteristics, however, the cells were thereby prejudiced by having quite low energy densities, and therefore the cells were not widely accepted in the market.

Several specific patents which address some of the issues above, and the approaches to preserve the rechargeability of cells, are discussed below:

AMANO et al, U.S. Pat. No. 3,530,496, issued Sep. 22, 1970, provide alkaline $MnO_2/Zn$ cells which are rechargeable, but where the depth of discharge of the manganese dioxide cathode is severely regulated by limiting the available capacity of the zinc anode to less than 40% of the available capacity of the $MnO_2$ cathode. Indeed, Amano et al suggest that anode limitation is preferably in the range of 20% to 30% of the $MnO_2$ cathode capacity, to achieve optimum performance of the cells. In practise, the theoretical capacity of the cell is not realized, except at very low drain rates.

The Amano et al cells achieve their zinc anode limitations by providing cathodes which are essentially equal in their dimensions to those of primary alkaline cells, and then reducing the zinc capacity by placing a cylindrical gelled zinc anode adjacent to the $MnO_2$ cathode and separated from it by suitable two component separators; and then by filling the center of the cell with gelled electrolyte that does not have any active anode material added to it. It should be noted that Amano et al prefer amalgamated copper particles to be included in the anode so as to enhance its conductivity. They also provide a zinc oxide reserve mass, and they must use a perforated coated screen current collector rather than a single nail as might otherwise be used in primary alkaline cells—and as used in the present invention.

AMANO et al teach that the stoppage of discharge of the rechargeable alkaline manganese cells is regulated by the capacity of the zinc negative electrode, so that the discharge depth of the positive electrode is controlled. This precludes the necessity to interrupt discharge of the cell either as a consequence of voltage or time, and thus overcomes some of the difficulties experienced with earlier cells. The cell is described as having a positive electrode made of pressurized mixture of $MnO_2$ together with graphite powder, etc., and that it can be used within 20% of the real capacity of a similar primary cell. The cell may provide 40 to 60 cycles however after 40 to 60 charge-discharge cycles there is no reversibility of the positive electrode.

KORDESCH, in U.S. Pat. No. 4,091,178, issued May 23, 1978, provides a rechargeable $MnO_2/Zn$ in which the anode capacity is specifically limited to about 33% of the capacity of the cathode. Kordesch also provides a charge reserve mass in which a quantity of zinc oxide is placed equal to at least 50% of the anode discharge capacity. Once again, because there is an excessive capacity of $MnO_2$, as well as additional ZnO, the energy density of the Kordesch cell is quite low.

DZIECIUCH et al, were granted U.S. Pat. No. 4,451,543 on May 29, 1984. That patent teaches a rechargeable $MnO_2/Zn$ cell where the $MnO_2$ is doped with heavy metals such as bismuth or lead. The intention is that up to 50% of the theoretical two electron capacity of the $MnO_2$ can be reached. However, the $MnO_2$ cathode comprises relatively high quantities of carbon, which results in the cathodes having a low specific density and a low cell energy density. Still further, it must be noted that in practical cells the second electron reduction step of the $MnO_2$ occurs at a too low voltage, namely below 0.9 volts. It is questioned, therefore, whether such cells as are provided by Dzieciuch et al are capable of delivering even a relatively substantial portion of their theoretical capacity above 1.1 volts—the minimum operating voltage of various electronic devices—or even above the 0.9 volt cutoff voltage that is generally required in uses such as toys, small battery driven appliances, and the like.

OGAWA et al, in U.S. Pat. No. 3,716,411, issued Feb. 13, 1973, teach a rechargeable alkaline manganese cell, the discharge capacity of the anode of which is controlled within such a range that the cathode can be recharged; and wherein the anode and cathode face each other through a gas permeable and dendrite impermeable separator. However, the OGAWA et al cell is strictly anode limited in that the capacity of the anode is held to be not more than about 40% of the theoretical one electron discharge capacity of the manganese dioxide. OGAWA et al discuss the fact that if a zinc-manganese dioxide cell is discharged so that its terminal voltage reaches a voltage below 0.9 volts and down to about 0.75 volts, and where the capacity of the zinc negative electrode is about the same or slightly smaller than that of the manganese dioxide positive electrode, then the effect of the discharge on the manganese dioxide is such that it is non-reversible at least in part. OGAWA et al provide that under no conditions should the depth of discharge of the anode be permitted to exceed 60% of the theoretical one electron discharge capacity of the manganese dioxide cathode. OGAWA et al provide an alternative structure which comprises two positive electrodes, one on either side of the anode, and wherein the inner positive electrode is contained within a perforated nickel plate steel pocket or canister.

KORDESCH et al, U.S. Pat. No. 4,957,827 issued Sep. 18, 1990, is commonly owned herewith. KORDESCH et al teach a cathode which is preferably molded having a plurality of discrete pellets. However, it must be noted that KORDESCH et al require the use of a screen as an oxygen evolution catalyst. Moreover, the anode capacity of the KORDESCH et al patent is limited to about 40% of the one electron capacity of the $MnO_2$ cathode—in other words, having a similar capacity limitation to AMANO et al described above.

Applicant also refers to OGINO et al U.S. Pat. No. 4,863,817, issued Sep. 5, 1989. That patent is directed to a cell which uses electrolytic manganese dioxide in its cathode, but OGINO et al specifically describe a cell that has a non-aqueous electrolyte (e.g., having a lithium electrode). OGINO et al achieve the electrolytic $MnO_2$ by subjecting a manganese dioxide-forming electrolytic solution to electrolysis which introducing a gas such as nitrogen through a plating solution. OGINO et al specifically require high purity manganese dioxide to obtain the excellent charge and re-charge properties with discharge voltage flatness, relatively high capacity and better cycle performance.

The matter of capacity utilization in primary alkaline cells which have an additional amount of manganese dioxide is addressed in LEGER U.S. Pat. No. 2,993,947, issued Jul. 25, 1961. There, the additional $MnO_2$ is found in the cell so as to preclude the cell from leaking if it is left in an operating device and is thereby utilized as an energy source over extended periods of time. It must not be overlooked, however, that LEGER contemplates only primary cells.

Clearly, the intent of the present invention is to provide cells having a high initial capacity, high discharge voltage, high cumulative capacity, an extended cycle life, and cells that are capable of maintaining high drain rates over most of their lifetime. Moreover, cells according to the present invention must be capable of being easily and economically manufactured, with production costs substantially in the order of the production costs of high quality primary alkaline cells.

BRIEF DESCRIPTION OF THE DRAWINGS

The present invention is described hereafter in greater detail, in association with the accompanying drawings, in which.

DESCRIPTION OF THE PREFERRED EMBODIMENTS:

In general, the cell design of the present invention embodies a cathode and an anode that are designed and placed so as to achieve maximum space utilization. Rechargeable cells having increased energy capacities when compared to prior art cells are therefore provided by the present invention.

Figure 1:
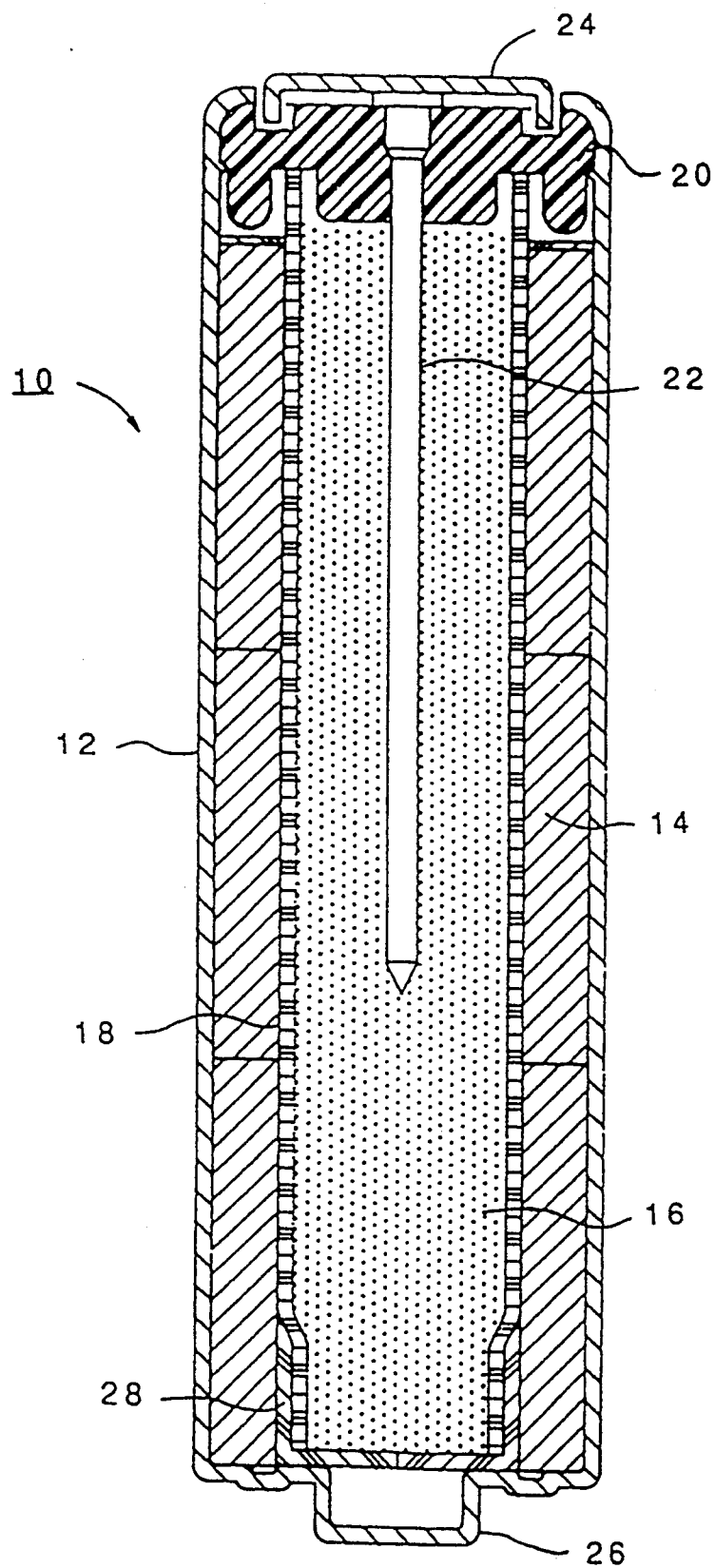
FIG. 1 is a cross-section of a typical cylindrical rechargeable alkaline manganese dioxide cell with a zinc anode, according to the present invention.

A typical cylindrical cell is shown in FIG. 1, at 10. The cell comprises a container 12, within which is a cathode 14 and an anode 16. Between the cathode and the anode there is located a separator 18. The cell is sealed by a closure member 20; and a current collector 22 in the form of a nail extends through the closure member 20 into the anode 16. The nail 22 contacts a metal cap 24 placed (or welded) across its head and across the closure member 20, to provide a negative contact for the cell 10. At the other end of the cell, a pip 26 is formed to provide a positive contact for the cell; and it is insulated from the anode 16 by an insulating washer or cup 28.

Certain specific options and alternative compositions and embodiments of cells according to the present invention are now discussed:

In general, the container or can 12 is a nickel plated deep drawn steel can, although other suitable metal cans may be used. So as to improve the contact and conductivity between the cathode 14 and the can 12, and thereby so as to reduce the internal resistance of the cell, the internal surface of the container 12 may be coated with a conductive coating such as LONZA (TM). Moreover, by using the conductive coating on the interior surface of the container 12, the risk of iron leaching from the can into the cell, which could result in increased hydrogen gassing of the anode, is reduced.

Referring to the cathode, which is manganese dioxide, it is noted that alkaline battery grades of commercially available electrolytic manganese dioxide are utilized. The usual cathode composition provides for about 5% to about 15% by weight of carbon, which may be graphite or carbon black, so as to enhance the conductivity of the cathode, together with a binder. Typical binder and cathode compositions are taught in U.S. Pat. No. 4,957,827 to KORDESCH et al, and assigned to a common assignee with the present invention. The cathode may also contain reinforcing agents such as graphite fibres, as taught in U.S. Pat. No. 5,108,852 issued Apr. 28, 1992, in the name of Tomantschger and Michalowski, and commonly owned with the present invention. Otherwise, an organic binder such as PTFE or polyethylene, or the like, may be used.

Hydrogen gas recombination within the cathode is, of course, to be accomplished in a rechargeable alkaline cell, and to promote such hydrogen gas recombination the cathode composition may include hydrogen recombination catalysts such as those taught in commonly owned U.S. patent application Serial No. 07/520,820, filed Jul. 9, 1990, now U.S. Pat. No. 5,162,169. Still further, so as to provide for overcharge capability, an oxygen evolution catalyst as taught in U.S. Pat. No. 4,957,827, referred to above, may be utilized. Whatever catalyst is selected is chosen so as to be stable over a wide voltage range—typically from 0.9 volts versus Zn to 2.0 volts versus Zn—and also over a wide temperature range—typically from $-40°$ C. to $+70°$ C.—without any significant deterioration in performance of the cell. Such catalysts may be oxides, spinels, or perovskites of nickel, cobalt, iron, manganese, chromium, vanadium, titanium, and silver. Also, as taught in U.S. Pat. No. 4,957,827, the oxygen evolution catalyst may be placed on the outer surface of the cathode.

So as to ensure hydrogen gas porosity of the cathode, and thereby access of hydrogen gas into the cathode where the hydrogen will be oxidized, the cathode composition preferably contains both carbon black as well as the hydrophobic binder. Still further, for purposes of hydrogen gas porosity and accessibility, the cathode composition may further comprise from about 0.1% to 5.0% of a hydrophobic material such as PTFE, polyethylene, or polypropylene, together with an additional porous additive such as from about 0.1% to 5.0% of carbon black. Such additives improve the gas transport characteristics of the cathode, and thereby enhance the hydrogen recombination rate of the cathode.

Placement of the cathode 14 into the container 12 may be accomplished by molding the cathode into discrete pellets, and inserting them into the can. This may be followed by the additional step of recompacting the cathode once it is placed in the can. Alternatively, the cathode may also be extruded directly into the can 12.

The anode 16 comprises powdered zinc together with the suitable gelling agent such as carboxy methyl cellulose, acrylic acid polymers, starches, and their derivatives. The anode 16 may include additives to reduce or inhibit hydrogen gassing, such as small amounts of mercury, gallium, indium, or cadmium. Certain commercially available organic hydrogen gassing inhibitors such, as GRILLIN (TM) may also be used.

The choice of gelling agents will depend on its gelling characteristics, the temperature and chemical stability of the gelling agents—and, indeed, of the production circumstances—as well as the capability of the gelling agent to release hydrogen gas that may be produced in the cell. Zincate mobility within the cell may be reduced by the use of additives such as compounds of magnesium, barium, and calcium, typically their oxides, or their hydroxides. Oxygen gas recombining agents may also be added to the zinc anode as are taught in commonly owned U.S. patent application Ser. No. 07/478,638, filed Feb. 12, 1990; now U.S. Pat. No. 5,043,234 issued Aug. 27, 1991.

The electrolyte is an aqueous alkali metal hydroxide solution, usually 4N to 12N potassium hydroxide solution. The electrolyte may contain additives such as dissolved zinc oxide so as to reduce the gassing of the active zinc within the anode, and so as to permit overcharge of the cell without damage to it.

The plastic closure member 20 normally contains a safety vent (not shown) which may be simply a rupturable membrane, or a resealable vent. The plastic closure member is molded from a thermoplastic material having enhanced hydrogen permeation rates, such as polypropylene, talc filled polypropylene, and nylon.

The design of the separator 18 is such that it is a complex structure that exhibits the characteristic of being permeable to the passage of gasses such as hydrogen and oxygen that are produced in the cell on overcharge, standby, or discharge; and that it is impermeable to zinc dendrites so as to preclude the possibility of zinc dendrites causing a short circuit within the cell. Thus, the separator tube comprises an absorber layer and a barrier layer. The absorber layer may be made of rayon or polyvinyl acetate fibre; and the barrier layer may consist of cellulose, CELLOPHANE (TM), polyamide, polyethylene, and the like. Certain commercially available separator materials such as CELGARD (TM) and PERMION (TM), maybe used.

Certain experimental data which establish the criteria and rating limitations of the present invention are now discussed:

First, means must be determined so that different designs of cells, and their practical and theoretical energy capacities, may be compared. Of course, it is desirable that energy densities of different cells might be compared in actual discharge experiments; however, in practice, great difficulties in making such comparisons are encountered. For example, it is well known that the drain rate of a cell, expressed for example as mA/g of active material, may affect the utilization of the theoretical energy capacity for a given electrode composition. In essence, the practical capacity of an electrode approaches the theoretical capacity of the electrode only in circumstances where a very low drain rate can be maintained. Such circumstances may be, for example, electrical clocks where the clock runs continuously for a year or more on a single AA cell; but most battery powered devices such as radios, tape players, electric toys, and the like, require considerably higher drain rates.

In any event, the degree of utilization of the electrode also depends on the composition of the electrode; for example, whether the electrode includes conductive additives, as well as the particle size of the active material of the electrode, the electrolyte concentration, and so on. Thus, specific cells can be designed and optimized for high drain rate circumstances, or for low drain rate circumstances.

That fact of different cell designs to accommodate different drain rates thereby makes it necessary to perform tests on commercially available cells over all drain rates that may be encountered in practical applications; and then to apply weighting factors for each drain rate so as to attempt to determine which cell has demonstrated the best overall performance. However, depending on the cell balance, the drain rate that is based on the active material content of the electrodes of the cell, will be different for different designs. A specific example follows:

EXAMPLE I:

The following compositions were used to construct half-cells, both as to the cathode composition and the anode composition. Each cell is expressed in parts by weight:

TABLE 1

Composition of $MnO_2$ and Zn Electrodes Used In the Half Cell Tests

| Cathode Composition | | Anode Composition | |
|---|---|---|---|
| $MnO_2$ | 84.5 | Zn(3% Hg) | 65.50 |
| Graphite | 9.00 | CMC/CARBOPOL*(1/1) | 1.00 |
| 9N KOH | 6.50 | 9N KOH, 5M ZnO | 33.50 |

*(TM)

Figure 2:
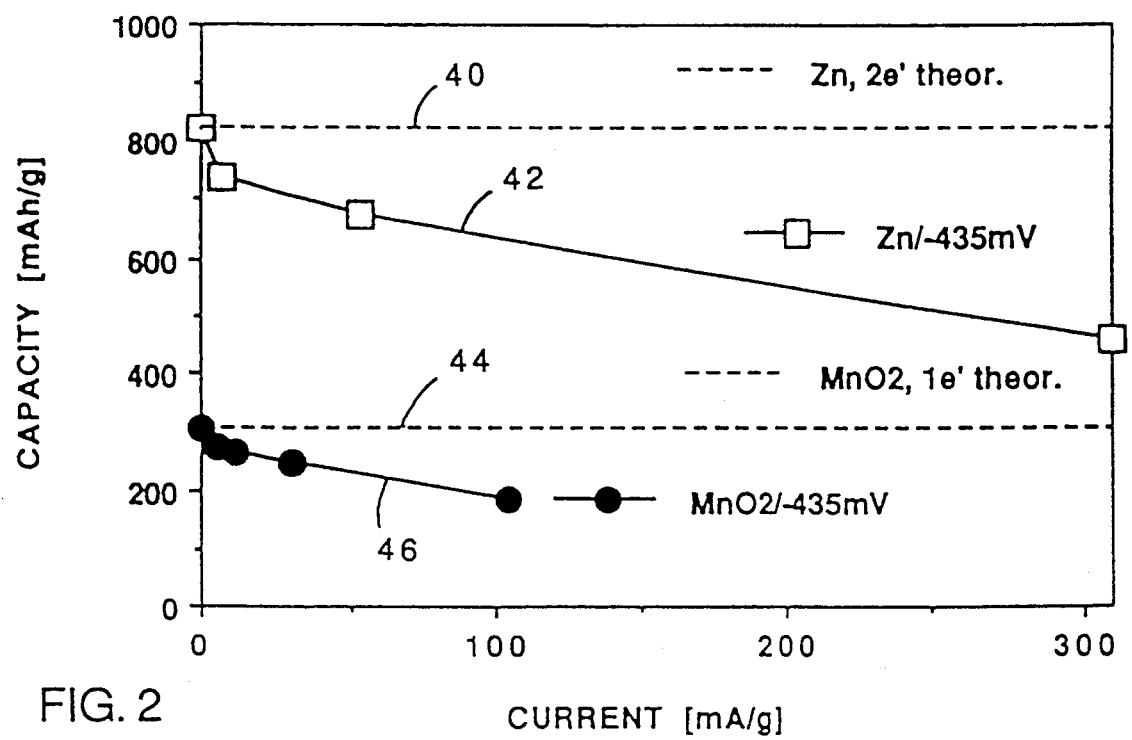
FIG. 2 shows curves comparing the capacity of active material of manganese dioxide cathodes and zinc electrodes intended for use in cells according to the present invention, where the data were determined in half cell tests.

Half cell experiments were then carried out, at various drain rates expressed in terms of mA/g. The capacity of the active material for the zinc and the manganese dioxide was determined in mAh/g, at various drain rates. The results are shown in FIG. 2, where curve 40 shows the theoretical zinc capacity (2e−) and curve 42 shows the actual determined capacity of zinc to a cutoff voltage of −435 mV versus a Hg/HgO reference electrode voltage. Likewise, curve 44 shows the theoretical capacity of manganese dioxide for the one electron (1e−) discharge, and curve 46 shows the measured capacity at various drain rates to a cutoff voltage of −435 mV versus a Hg/HgO reference electrode voltage. It is clear from FIG. 2 that only the theoretical energy content or capacity of respective cells provides a reliable means of comparing cell designs.

EXAMPLE II:

Having determined that the best comparison between cell designs is only in respect of their theoretical energy capacity, various cell designs of AA test cells were fabricated in keeping with the teachings of the three prior art patents noted above. Then, their theoretical energy capacities were analyzed, with the result being shown in Table 2, below. It should be noted that the comparisons are made on the basis of each of the cells having a volume of 7.5 ml, a weight of 22.5 g, an operating voltage of 1.25 volts, and with 3.6 g of active material. The theoretical capacities are in practise, and as discussed above, achievable only at low discharge rates. Table 2 also provides the theoretical gravimetric and volumetric energy densities of the respective prior art cells; and included in Table 2 in all categories shown in that Table is a cell in keeping with the present invention.

TABLE 2

AA Cell Design Comparisons

| | Kordesch 4,091,178 | Amano 3,530,496 | Dzieciuch 4,451,543 | Present Design |
|---|---|---|---|---|
| $MnO_2${Ah} | 2.89 | 2.97 | 1.32 | 2.76 |
| Zn{Ah} | 0.85 | 1.19 | 1.62 | 1.93 |

TABLE 2-continued

AA Cell Design Comparisons

| | Kordesch 4,091,178 | Amano 3,530,496 | Dzieciuch 4,451,543 | Present Design |
|---|---|---|---|---|
| Cell{Ah} | 0.85 | 1.19 | 1.32 | 1.93 |
| Zn:$MnO_2$ Ratio theor. Energy Density | 0.30 | 0.40 | 1.20 | 0.70 |
| {Wh/kg} | 47 | <66 | 69 | 107 |
| {Wh/l} | 142 | <198 | 176 | 322 |

It should be noted that the ratio expressed as Zn:$MnO_2$ is that which refers to the balance of the cell, or in other words that refers to the manner by which the cell is anode limited in respect of the discharge capacity of the anode with respect to the theoretical one electron discharge capacity of the $MnO_2$ cathode. Thus, a Zn:$MnO_2$ ratio of 0.30 is another expression of noting that the balance of the cell is 30%, or that the cell is anode limited in that the theoretical two electron (2e−) discharge capacity of the zinc is 30% of the theoretical one electron (1e−) discharge capacity of the $MnO_2$ cathode. Similar ratios are expressed in further Tables, below.

Table 3, below, is the composition of the cathode and anode used in the cell of the present invention as specified in Table 2 above.

TABLE 3

Composition of Present Design Test Cells Used in Example II

| Cathode Composition | | Anode Composition | |
|---|---|---|---|
| $MnO_2$ | 83.03 | Zn(1.0% Hg) | 65.50 |
| Graphite | 9.00 | CMC/CARBOPOL*(1/1) | 1.00 |
| Carbon | 0.37 | 9N KOH, 5M ZnO | 33.50 |
| Carboflex (TM) | 1.00 | | |
| 9N KOH | 6.50 | | |

*(TM)

EXAMPLE III:

Using the cathode and anode compositions as described above, the present invention was applied to AAA, AA, C, and D cells having conventional cylindrical cell configurations. The capacity in ampere-hours of cells in each size was determined, as noted below in Table 4, and the cells were constructed having the respective ratios of the zinc anode to the $MnO_2$ cathode as noted in Table 4.

TABLE 4

Energy Densities of Cylindrical RAM Cells According to the Present Design

| | AAA | AA | C | D |
|---|---|---|---|---|
| Capacity {Ah} | 1.02 | 1.93 | 5.73 | 11.46 |
| Zn:$MnO_2$ Ratio theor. Energy Density | 0.95 | 0.70 | 0.64 | 0.55 |
| {Wh/kg} | 116 | 107 | 116 | 104 |
| {Wh/l} | 364 | 322 | 311 | 298 |

The theoretical energy densities, both gravimetric and volumetric were then determined, as also noted in Table 4. It will be seen that the gravimetric energy densities generally range from about 100 Wh/kg to about 120 Wh/kg; and that the volumetric energy densities generally ranged from about 275 Wh/liter to about 375 Wh/liter.

EXAMPLE IV:

Cells in keeping with the present invention and having cathode and anode compositions as noted below in Table 5 were constructed. However, one set of AA cells was constructed having an anode:cathode ratio of about 37%; and the other set of AA cells was constructed having an anode:cathode ratio of about 70%. Those cells were then subjected to deep discharge tests at 3.9 Ohms, to a 0.9 volt cutoff. The results of those tests are shown in FIG. 3.

TABLE 5

| Composition of Present Design Test Cells used in Example IV | | | |
|---|---|---|---|
| Cathode Composition | | Anode Composition | |
| $MnO_2$ | 83.03 | Zn(0.15% Hg) | 65.50 |
| Cathode Additives & Electrolyte | 16.97 | Anode Additives & Electrolyte | 34.50 |

Figure 3:
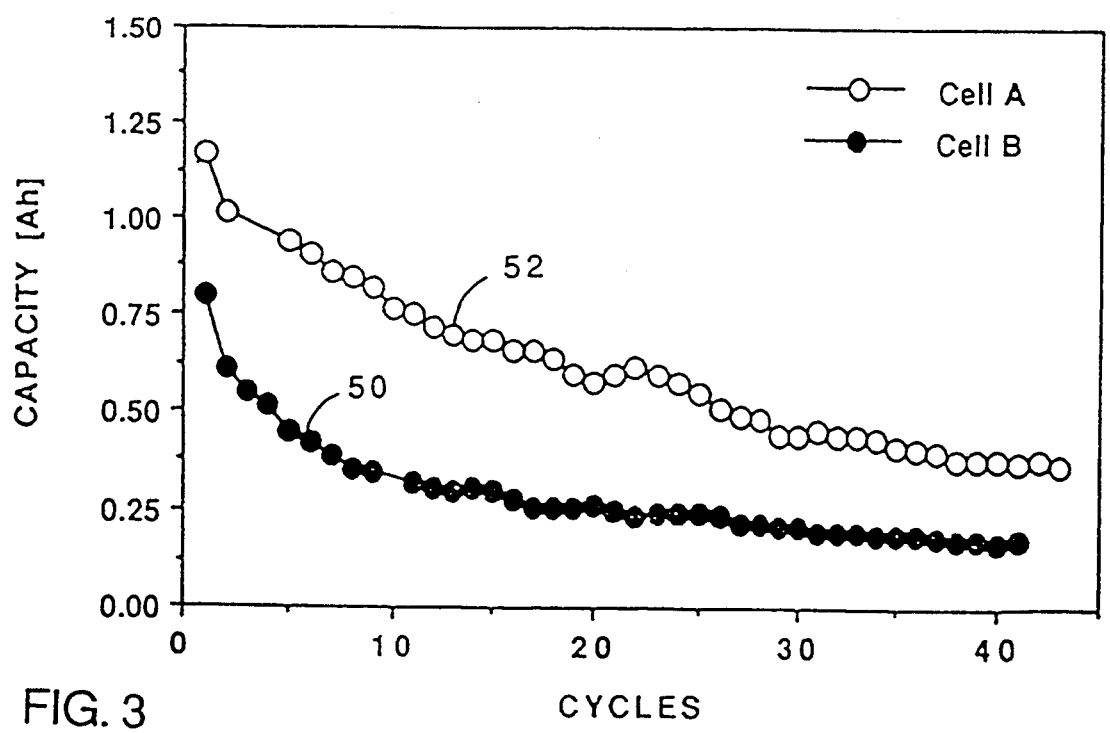
FIG. 3 shows the results of cycling tests using deep discharge cycles, for two different cell configurations having differing ratios of anode capacity to cathode capacity.

It will be seen from FIG. 3 that the cells having an anode:cathode ratio of 37% are shown in curve 50; and cells having an anode:cathode ration of 70% are shown in curve 52. The average cell life of the cells shown in curve 50 was 8 cycles above the 300 mAh capacity cutoff. The average cell life of the cells shown in curve 52 was more than 40 cycles before the cutoff of 300 mAh capacity was reached. It will also be noted that the cumulative capacity of the cells in curve 52 for the first 25 cycles was about 19.4 Ah; whereas the cumulative capacity for the first 25 cycles of the cells in curve 50 was only 8.3 Ah. Thus, over the first 25 cycles, the cumulative capacity of cells in keeping with the present invention and having an anode:cathode ratio of 70% as compared with cells having an anode:cathode ratio of 37%, was exceeded by more than 100%. Clearly, the cells with an anode:cathode ratio of 37% are emulative of prior art cells, particularly such as those taught by Amano et al and Kordesch, as discussed above.

Figure 4:
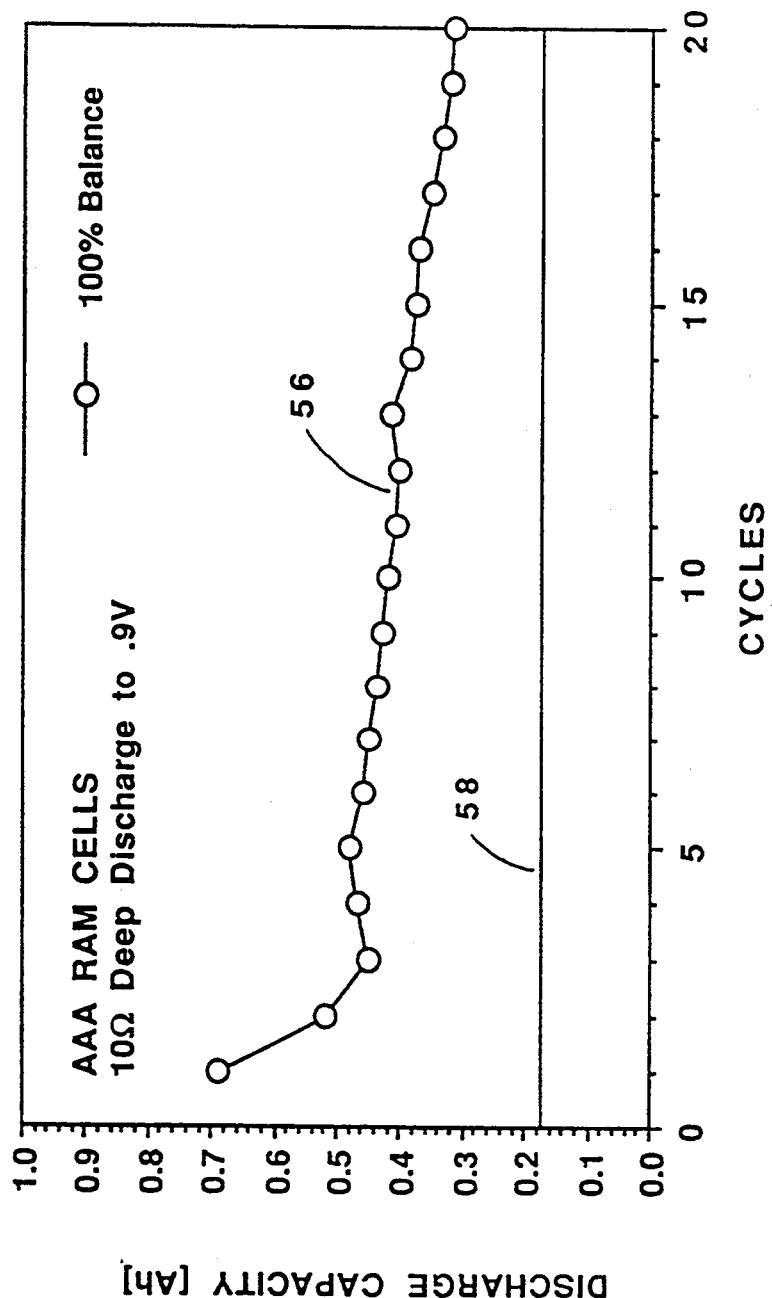
FIG. 4 is a curve similar to FIG. 3 showing the results of cycling tests for AAA cells having 100% balance between the capacity of the zinc anode with respect to the theoretical one electron discharge capacity of the cathode.

EXAMPLE V:

Finally, further sets of cells in keeping with the present invention, and having cathode and anode compositions as noted below in Table 6, and energy densities as noted below in Table 7, were constructed. All of those cells were constructed as AAA cells. The cells were then subjected to deep discharge tests into 10 ohms, as shown in FIG. 4. Other cells were subjected to photoflash tests into 3.6 ohms with flash cycling of 15 seconds flash charging and 45 seconds rest between flashes, as shown in FIG. 5.

TABLE 6

| Composition of Test Cells used in Example V | | | |
|---|---|---|---|
| Cathode Composition | | Anode Composition | |
| $MnO_2$ | 79% | Zn | 56%* |
| Cathode Additives & Electrolyte | 21% | Anode Additives & Electrolyte | 44% |

*set for 937 mAh capacity

The additives used in the cathode and the anode are typical additives as used in rechargeable alkaline manganese/zinc cells. Typical cathode additives as used herein are taught in detail in commonly owned U.S. Pat. No. 5,108,852, noted above. Other hydrogen recombination catalysts and other cathode additives are discussed in commonly owned U.S. patent application Ser. No. 07/520,820, also noted above. Typically, cathode additives include, in any event, from about 5% to 15% by weight of conductive carbon and a binding agent, together with electrolyte and other additives as noted elsewhere in this present application and in the commonly owned inventions identified above.

Typical anode additives include zinc oxide, a gelling agent, and anolyte (typically, 9N KOH with 5% ZnO dissolved in it), as also discussed in commonly owned U.S. Pat. No. 5,108,852. Still further anode compositions, with typical additives, are discussed in commonly owned U.S. Pat. No. 5,043,234, issued in the names of Tomantschger, Kordesch, and Oran on Aug. 27, 1991. It will also be noted that the anode composition is, itself, balanced so that the amount of zinc present in the composition provides a discharge capacity for the zinc of 937 mAh. This, in turn, provides for a ratio of zinc to the theoretical one electron $MnO_2$ discharge capacity of 1.00, or 100% balance, as noted below in Table 7.

TABLE 7

| Energy Densities of Cylindrical AAA Cells used in Example V | |
|---|---|
| Cell Capacity (theoretical) {Ah} | 0.937* |
| Zn:$1e^-$ $MnO_2$ ratio | 1.00 (or 100%) |
| Theoretical Energy Densities | |
| {Wh/Kg} | 107 |
| {Wh/l} | 339 |

*(The cells are designed so that the theoretical one electron discharge capacity {$1e^-$} of the $MnO_2$ electrode is 0.937 Ah; and likewise, the theoretical two electron discharge capacity {$2e^-$} of the Zn electrode is also 0.937 Ah. Moreover, the theoretical anode capacity may be expressed as a ratio or as a percentage of the cathode capacity or as a ratio; thus 1.00 or 100%)

The results of the tests that were conducted are shown in FIG. 4 and 5. In FIG. 4, curve 56 shows the average of three AAA cells after each was deep discharged into 10 ohms to 0.9 volt cutoff. These tests were conducted over 20 cycles, and were taken with a comparison to curve 58 which shows the typical capacity of a similar NiCd cell having similar physical size. It will be seen that, even after 20 cycles, the capacity of the cells in keeping with the present invention was still about twice the typical capacity of a brand new NiCd cell.

In all of the tests in Example V, as noted above, the cells were anode limited to the extent that the discharge capacity of the anode was set to be 100% of the theoretical one electron discharge capacity of the $MnO_2$ cathode.

SUMMARY

There has been described improved rechargeable alkaline manganese cells having significantly better gravimetric and volumetric energy densities than prior art cells, and having higher capacity than prior art cells. Various examples have been shown, with discussion of a number of different specific compositions.

Specifically, all of the above teaches a sealed rechargeable alkaline manganese cell of typical construction—usually a cylindrical bobbin-type cell, but coin or button cells may also be contemplated. In any event, the zinc anode consists mainly of gelled powdered zinc together with appropriate anode additives; and the manganese dioxide cathode consists mainly of $MnO_2$ together with from about 5% to about 15% by weight of conductive carbon additive, a binding agent, and other typical cathode additives. The electrolyte consists mainly of aqueous alkaline metal hydroxide, typically KOH. The particular and specific purpose of the present invention is to provide such rechargeable alkaline manganese dioxide/zinc cells that are anode limited, by that, it is meant that the discharge capacity of the anode is in the range of from about 55% to 100% of the theoretical one electron discharge capacity of the cathode. Thus, the Zn:1e$^-$MnO$_2$ ratio is from 0.55 to 1.00, or the balance of the cell is from 55% to 100% anode/cathode. In all events, the gravametric energy density of the cell exceeds 70 Wh/Kg, and the volumetric energy density of the cell exceeds 200 Wh/l.

Other compositions and assemblies of cells in keeping with the present invention can be determined and effected without, however, departing from the spirit and scope of the present invention as defined by the appended claims.

WE CLAIM:

1. A rechargeable alkaline manganese cell comprising a metal container, a zinc anode, a manganese dioxide cathode, a separator between said anode and said cathode, a closure element to seal said cell, a current collector passed through said closure element and into said anode, and an alkaline electrolyte;

wherein said zinc anode consists mainly of gelled powdered zinc, said manganese dioxide cathode consists mainly of manganese dioxide together with from about 5% to 1 5% by weight of conductive carbon additive and a binding agent, and said electrolyte consists mainly of an aqueous alkali metal hydroxide;

wherein said alkaline manganese dioxide cell is anode limited in that the anode has a theoretical discharge capacity which is in the range of from at least 64% up to 100% of the theoretical one electron discharge capacity of said cathode;

and wherein the theoretical gravimetric energy density of said cell exceeds 70 Wh/Kg and the volumetric energy density of the cell exceeds 200 Wh/liter.

2. The rechargeable alkaline manganese cell of claim 1, wherein said electrolyte is 4N to 12N potassium hydroxide.

3. The rechargeable alkaline manganese cell of claim 2, wherein said electrolyte has a small quantity of zinc oxide dissolved therein.

4. The rechargeable alkaline manganese cell of claim 2, wherein said current collector is a single nail extending into said anode.

5. The rechargeable alkaline manganese cell of claim 4, wherein the manganese dioxide of said cathode is made from electrolytic manganese dioxide, together with a hydrogen recombination catalyst.

6. The rechargeable alkaline manganese cell of claim 5, wherein said manganese dioxide cathode further contains carbon fibre, a hydrophobic binder chosen from the group consisting of PTFE and polyethylene, and a further additive chosen from the group consisting of a hydrophobic additive in the amount of 0.1% to 5.0% by weight of one of the group consisting of PTFE, polyethylene, and polypropylene together with a porous additive in the amount of 0.1% to 5.0% by weight of carbon black.

7. The rechargeable alkaline manganese cell of claim 6, wherein said cathode is placed in said container by being molded into discrete pellets, by being molded into discrete pellets and then recompacted after placement in said container, or by being extruded into said container.

8. The rechargeable alkaline manganese cell of claim 5, wherein said gelled powdered zinc anode contains a gelling agent chosen from the group consisting of carboxy methyl cellulose, starches, and derivatives thereof.

9. The rechargeable alkaline manganese cell of claim 8, wherein said anode further comprises a small quantity of a hydrogen gassing inhibitor additive chosen from the group consisting of mercury, gallium, indium, cadmium, and commercially available organic hydrogen gassing inhibitors.

10. The rechargeable alkaline manganese cell of claim 8, wherein said anode contains a small quantity of an additive to reduce zincate mobility, wherein said additive is chosen from the group consisting of magnesium, barium, and calcium, their oxides, and their hydroxides.

11. The rechargeable alkaline manganese cell of claim 5, wherein said metal container is a nickel plated steel can.

12. The rechargeable alkaline manganese cell of claim 11, wherein said container is coated on its interior surface with a conductive coating.

13. The rechargeable alkaline manganese cell of claim 5, wherein said closure element has a safety vent formed therein, and is chosen from the group consisting of thermoplastic materials having enhanced hydrogen permeation characteristics consisting of polypropylene, talc filled polypropylene, and nylon.

14. The rechargeable alkaline manganese cell of claim 5, wherein said separator is a complex flexible structure which is gas permeable at least to gaseous hydrogen and oxygen, but impermeable to zinc dendrites.

* * * * *